United States Patent
Indyk et al.

(10) Patent No.: US 11,798,015 B1
(45) Date of Patent: Oct. 24, 2023

(54) ADJUSTING PRODUCT SURVEYS BASED ON PARALINGUISTIC INFORMATION

(71) Applicant: INTUIT INC., Mountain View, CA (US)

(72) Inventors: Benjamin Indyk, San Diego, CA (US); Igor A. Podgorny, Mountain View, CA (US); Raymond Chan, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 731 days.

(21) Appl. No.: 15/334,864

(22) Filed: Oct. 26, 2016

(51) Int. Cl.
   *G06Q 30/0203* (2023.01)
   *G10L 15/02* (2006.01)
   *G10L 15/22* (2006.01)
   *G10L 25/51* (2013.01)
   *G10L 15/30* (2013.01)

(52) U.S. Cl.
   CPC .......... *G06Q 30/0203* (2013.01); *G10L 15/02* (2013.01); *G10L 15/22* (2013.01); *G10L 15/30* (2013.01); *G10L 25/51* (2013.01); *G10L 2015/223* (2013.01)

(58) Field of Classification Search
   CPC .... G06Q 30/01; G06Q 30/0217; G06Q 30/02; G06Q 30/016; G06Q 30/0203; G06Q 30/0201; G06Q 30/0251; G06Q 30/0245; G06Q 30/0278; G10L 15/02; G10L 15/22; G10L 15/30; G10L 25/51; G10L 2015/223

USPC ........................................................ 705/7.32
See application file for complete search history.

(56) References Cited

U.S. PATENT DOCUMENTS

| | | | |
|---|---|---|---|
| 6,411,687 B1* | 6/2002 | Bohacek | H04M 3/51 379/201.11 |
| 9,613,619 B2* | 4/2017 | Lev-Tov | G10L 15/063 |
| 2005/0132267 A1* | 6/2005 | Aviv | G06Q 30/02 715/202 |
| 2006/0053058 A1* | 3/2006 | Hotchkiss | G06Q 30/02 705/14.13 |
| 2014/0316856 A1* | 10/2014 | Williams | G06Q 30/02 705/7.32 |
| 2015/0213800 A1* | 7/2015 | Krishnan | G10L 25/63 704/246 |
| 2015/0324811 A1* | 11/2015 | Courtright | H04W 4/06 705/7.32 |
| 2017/0076740 A1* | 3/2017 | Feast | G10L 25/63 |
| 2017/0118336 A1* | 4/2017 | Tapuhl | H04M 3/493 |
| 2018/0130076 A1* | 5/2018 | Celik | H04M 15/852 |

* cited by examiner

*Primary Examiner* — Patricia H Munson
*Assistant Examiner* — Thea Labogin
(74) *Attorney, Agent, or Firm* — Patterson + Sheridan, LLP (57) ABSTRACT

The present disclosure includes computer implemented techniques for providing a survey to a user. In one embodiment, a software application receives an audio stream including utterances spoken by the user interacting with a voice-user interface of the application. The application then determines a set of paralinguistic features from the audio stream and estimates at least a first attribute of the user based on the set of paralinguistic features. The application selects survey content based on a value of the first attribute and transmits a survey including the selected survey content to the user.

20 Claims, 5 Drawing Sheets

ADJUSTING PRODUCT SURVEYS BASED ON PARALINGUISTIC INFORMATION

BACKGROUND

Field

The present disclosure generally relates to adjusting software content provided to users. More specifically, the present disclosure provides techniques for adjusting software content provided to users based on paralinguistic information derived from an audio stream of a user interacting with a software application.

Related Art

Surveys are often used to collect user feedback related to a product. With respect to computer software products, a survey may be presented to the user while the user is using the computer software product as part of the user's interaction with the computer software product. For example, often an application or online service may present a survey to a user requesting feedback upon the user's completion of an activity within the application or service. Alternatively, a survey could be presented to the user at random to receive feedback regarding the user's overall experience with an application or service. A survey could also be sent to the user after the user has finished using the computer software product.

Various attributes of a user, such as the user's emotional state or demographics, can often affect whether the user is willing to participate in the survey and whether the user would provide useful feedback. Knowing a user's emotional state prior to issuing a survey could be helpful in determining whether sending a survey would be advantageous (e.g., whether the user would provide useful feedback in a survey response). Further, knowing the user's emotional state prior to issuing a survey could be helpful in determining what information, format, and survey writing style would be most advantageous to include in a survey (e.g., whether certain topics may prompt more useful feedback from the user, whether a certain length of survey would prompt more useful feedback from the user, etc.). Additionally, knowing the user's emotional state prior to issuing a survey could be helpful in determining the most advantageous time to send the survey (e.g., whether the user is more likely to provide useful results to an immediate survey, or to a survey sent at a later point in time). For example, if a user has a negative emotional state, it may be preferable to not send a survey at all, to send a relatively short survey, and/or to wait to send a survey. Alternatively, if a user has a positive emotional state, it may be effective to send a relatively long survey and/or to send the survey immediately.

SUMMARY

In one embodiment, a computer-implemented method provides a survey to a user. According to the method, a software application receives an audio stream including utterances spoken by the user interacting with a voice-user interface of the application. The application then determines a set of paralinguistic features from the audio stream and estimates at least a first attribute of the user based on the set of paralinguistic features by comparing the set of paralinguistic features to attributes in a speech database. The application selects survey content based on a value of the first attribute and transmits a survey including the selected survey content to the user.

In another embodiment, a non-transitory computer-readable storage medium contains instructions that, when executed by one or more processors, perform an operation for providing a survey to a user. The operation includes receiving an audio stream including utterances spoken by the user interacting with a voice-user interface of an application, determining a set of paralinguistic features from the audio stream, estimating at least a first attribute of the user based on the set of paralinguistic features by comparing the set of paralinguistic features to attributes in a speech database, selecting first survey content based on a value of the first attribute, and transmitting a survey including the first survey content to the user.

In another embodiment, a system includes one or more processors, and memory storing one or more applications, which, when executed on the one or more processors perform an operation for providing a survey to a user. The operation includes receiving an audio stream including utterances spoken by the user interacting with a voice-user interface of an application, determining a set of paralinguistic features from the audio stream, estimating at least a first attribute of the user based on the set of paralinguistic features by comparing the set of paralinguistic features to attributes in a speech database, selecting first survey content based on a value of the first attribute, and transmitting a survey including the first survey content to the user.

DETAILED DESCRIPTION

Embodiments presented herein provide techniques for extracting paralinguistic information from voice/speech of a user interacting with an application. The paralinguistic information generally refers to aspects of a person's speech that do not include the spoken words. That is, apart from the words spoken by a user, the paralinguistic information includes features such as volume, tone, word pace, pauses, and inflections made while the user is speaking. In one embodiment, such information is used to estimate an emotional state attribute of the user. Once determined, the emotional state of the user may be used to tailor the experience of a user interacting with the application. For example, the application may tailor content included in a feedback survey provided to the user based on the emotional state of the user.

Software applications or online services may include voice-user interfaces that support a spoken interaction with the application or service. That is, the software may support user input in the form of a spoken statement. For example, a user may input voice/speech to initiate services or processes, or input requests or queries. The voice/speech of the user may be captured as an audio stream by a computing device running the software application being used by the user. For example, a user may use voice/speech to input a query in the software application. Voice/speech may be input by the user at any number of points of user experience with the application (e.g., could possibly be input at any time during the user's experience, or could only be input at one or more particular points throughout the user's experience). An application server executing on a server may process an audio stream input by a user to extract paralinguistic information from the audio stream. The paralinguistic information may be used to estimate an attribute of the user that may be used in determining what survey, if any, to provide to the user.

Paralinguistic technically means "alongside linguistics" and therefore deals with those phenomena that are modulated onto or embedded into a verbal message, including acoustics and linguistics of the verbal message. For example, low level descriptors may be extracted from frames of the audio stream (e.g., 10-30 ms frames). These acoustic low level descriptors may include intonation (pitch, etc.), intensity (energy, Taeger functions, etc.), linear prediction cepstral coefficients (LPCC), perpetual linear prediction (PLP) parameters, cepstral coefficients (Mel frequency cepstral coefficients (MFCCs), etc.), formants (amplitude, position, width, etc.), spectrum (Mel frequency bands (MFB), NMF-based components, MPEG-7 audio spectrum projection, roll-off, etc.), TF transformation (wavelets, Gabor, etc.), harmonicity (harmonics-to-noise ratio (HNR), noise-to-harmonics ratio (NHR), etc.), and/or perturbation (jitter, shimmer, etc.). Further, the linguistic low level descriptors may include linguistic entities (phoneme sequences, word sequences, etc.), non-linguistic strings (laughter, sighs, etc.), and/or disfluencies (false starts, filled/unfilled pauses, etc.).

The extracted paralinguistic information of the voice/speech of the user may be used by a speech analysis component on the server to determine one or more attributes of the user. For example, the low level descriptors extracted from the audio stream may be compared to a speech database that stores attributes correlated to different low level descriptors. Therefore the low level descriptors extracted from the audio stream can be matched to different attributes. The attributes that may be determined may include gender of the user, age (or age range) of the user, one or more emotional states of the user (e.g., angry, afraid, positive, negative, joyful, happy, bored, alert, tranquil, excited, warm, aggressive, friendly, gloomy, etc.), etc. It should be noted that the attributes may not always be determined correctly, and may only be estimated with a probability that they are correct. In some cases, the application may be configured to assign attributes if the probability is above a minimum confidence value.

Note, some information about emotions of a user may be determined from the words included in the audio stream, i.e., the words spoken by the user. However, use of paralinguistic information to determine an emotional state of the user may provide a more accurate measure of the emotional state of the user than information extracted from the actual words. For example, a specific set of words (e.g., "Is the application worth the cost?") may be spoken with a negative or neutral tone that may not be detectable by mere natural language processing to extract the words from the audio stream alone. Accordingly, using paralinguistic information to determine attributes of a user may more accurately determine attributes of the user as compared to other methods, such as natural language processing.

Attributes estimated using the extracted paralinguistic information may be used to determine what survey, if any, to send to a user to obtain feedback about an application or online service. Sending surveys based on the estimated attributes could result in more constructive user feedback to the surveys. For example, the technique herein could prevent sending surveys to very negative users whose survey results would be so biased by the user's negative emotional state that the results include no constructive or useful feedback. Embodiments to capture and characterize paralinguistic information could also be used to identify users who are more willing to take a longer survey and provide constructive feedback. Additionally, surveys could be sent immediately to positive users to receive constructive feedback while the user has a positive emotional state, while sending of the survey could be delayed to a user having a negative emotional state. The technique could be used to tailor any aspect of the survey (e.g., listing of questions, wording of questions, number of questions, topic of questions, etc.) with respect to any attribute of the user.

Different aspects of these techniques are described in more detail herein, along with additional examples of how the techniques may be used to send or not send a survey based on paralinguistic information extracted from voice/speech of a user.

Figure 1:
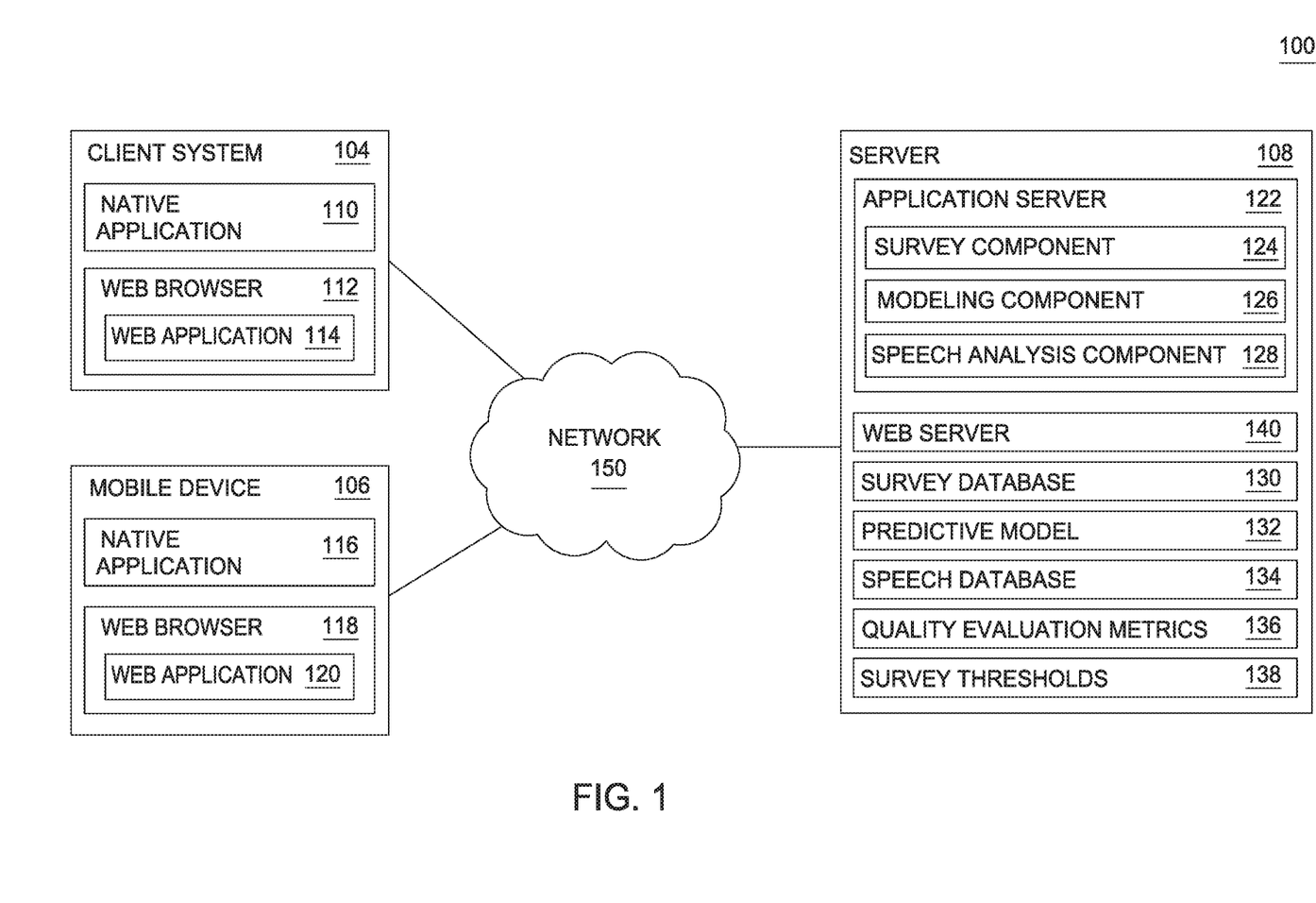
FIG. 1 illustrates an example computing environment that may be used to determine what survey, if any to send to a user based on paralinguistic information extracted from voice/speech of a user, according to one embodiment.

FIG. 1 illustrates an example computing environment 100 that may be used to determine what survey, if any to send to a user based on paralinguistic information extracted from voice/speech of a user, according to one embodiment. As shown, the environment 100 includes a client system 104, a mobile device 106, and a server 108, which all communicate via a network 150. The server 108 is executing an application server 122 and a web server 140. The application server 122 includes survey component 124, modeling component 126, and speech analysis component 128. As shown, the server 108 includes survey database 130, predictive model 132, speech database 134, quality evaluation metrics 136, and survey thresholds 138. Client system 104 is executing a native application 110 and a web browser 112. Web application 114 is executing on the web browser 112. Similarly, Mobile device 106 is executing native application 116 and web browser 118. Web application 120 is executing on the web browser 118. An audio stream input by a user is captured by a native application 110, 116 or a web application 114, 120. The web server 140 receives the audio stream input spoken by the user. The application server 122 analyzes the audio stream input, and then the web server 140 provides a survey generated by the application server 122 to the user at the native application 110, 116 or web application 114, 120.

Figure 2:
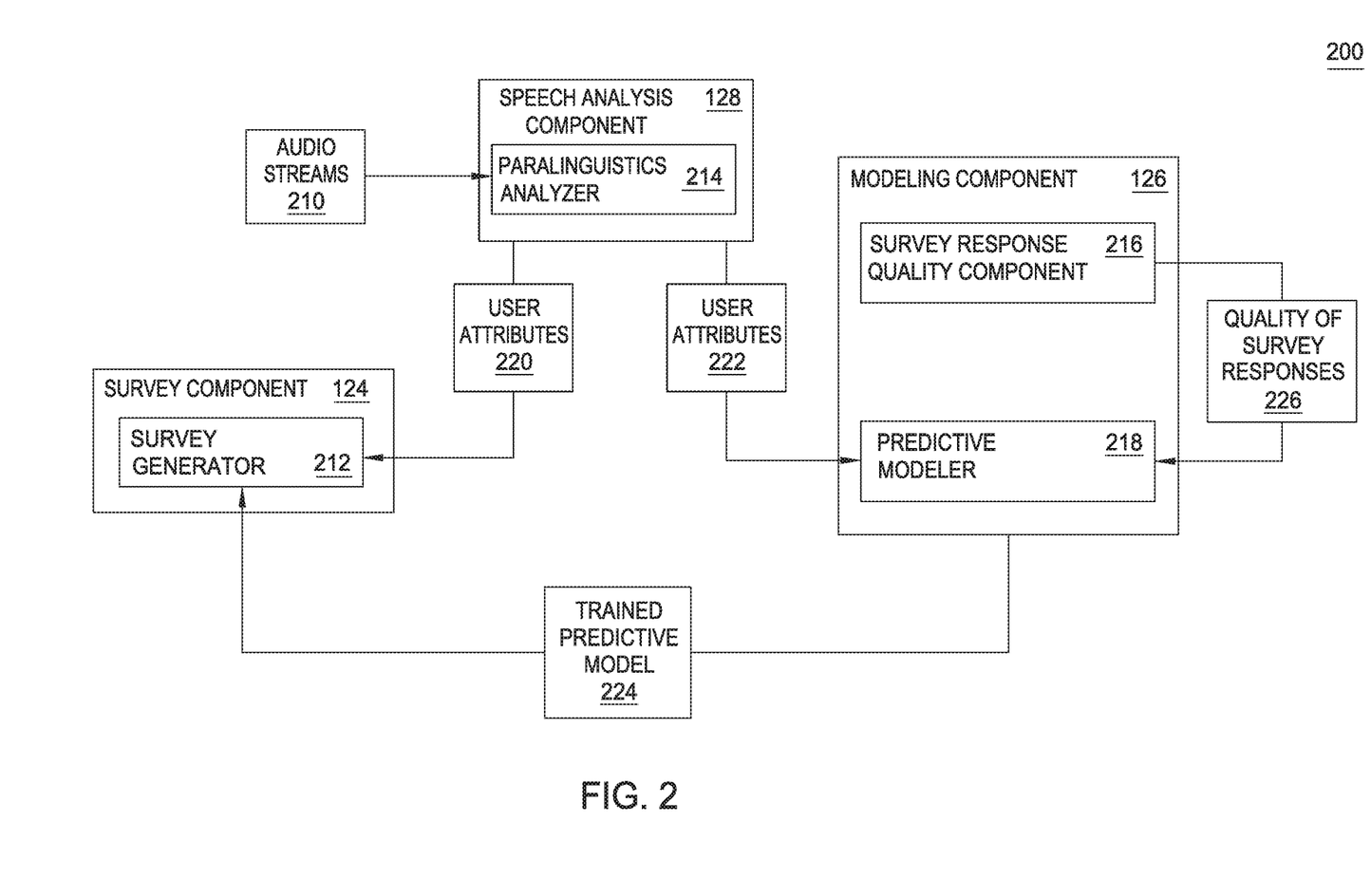
FIG. 2 illustrates components of the computing environment in FIG. 1, according to one embodiment.

FIG. 2 illustrates components of the computing environment 100 in FIG. 1, according to one embodiment. Specifically, FIG. 2 illustrates the components of the application server 122 on server 108 (survey component 124, speech analysis component 128, and modeling component 126). A paralinguistics analyzer 214 of the speech analysis component 128 receives audio streams 210 that have been input by a user through a voice-user interface of a native application 110, 116 or a web application 114, 120 at either a client system 104 or a mobile device 106. For example, a user interacting with a native application 110 on a client system 104 may cause the native application 110 to record the audio stream of the user through a voice-user interface of the application 110. This spoken audio stream 210 is then received at the server 108 at the paralinguistics analyzer 214. The user may input the spoken audio stream 210 using any native application 110, 116 or any web application 114, 120 at either a client system 104 or a mobile device 106.

The paralinguistics analyzer 214 extracts paralinguistic data from the audio stream 210 using techniques or software like EmoVoice, OpenEar, Yaafe, Voice Search DB with Accent and Tone, VoiceVault, AT&T APIs, etc. The paralinguistics analyzer 214 then estimates one or more attributes 220, 222 of the user based on the extracted paralinguistics data. For example, the paralinguistics analyzer 214 may estimate one or more attributes by comparing the low level descriptors extracted from the audio stream 210 to different low level descriptors (as described above) or combinations of low level descriptors correlated with attributes in speech database 134 stored at server 108. For example, low level descriptors, including pitch and intensity, may be used to estimate whether the user has a positive or negative emotional state attribute.

In one example, the estimated attribute 220, 222 may be the positive/negative emotional state of the user, and the paralinguistics analyzer 214 may determine a score for the user's positive/negative emotional state. The positive/negative emotional state score may be determined on a scale between −1 and +1, with −1 being the negative extreme, and +1 being the positive extreme. A score from −1 up to 0 may be considered a negative emotional state, and 0 to +1 may be considered a positive emotional state.

Modeling component 126 includes a survey response quality component 216 and a predictive modeler 218. The survey response quality component 216 detects a submitted user response to a survey. The survey response quality component 216 then evaluates the quality of the response 226 according to quality evaluation metrics 136 stored at server 108. The quality evaluation metrics 136 may be input by an administrator at server 108. The quality evaluation metrics 136 may include instructions that assign a score to a plurality of possible survey responses, such as, complete answers, incomplete answers, uniform responses to every question, varied responses to questions, a length of time spent taking the survey, etc. The quality evaluation metrics 136 may include instructions that score the quality of a user's response to a survey as a whole, and/or the instructions may individually score the quality of the user's response with respect to various topics and questions. The scores are indicative of the quality of the response(s) 226. For example, a higher score may indicate a more useful response, while a lower score may indicate a less useful response.

For each survey for which the survey response quality component 216 evaluates the user's response, an audio stream 210 spoken by the user is analyzed by the paralinguistics analyzer 214 prior to sending the survey to the user to estimate an attribute 222 of the user. Thus, for every quality score 226 evaluated by the survey response quality component 216, a corresponding user attribute 222 is estimated by the paralinguistics analyzer 214.

The predictive modeler 218 uses the scores indicative of the quality of the survey responses 226 generated by the survey response quality component 216 and the corresponding user attributes 222 estimated by the paralinguistics analyzer 214 to train a predictive model 132. The predictive model 132 may be generated using any possible predictive model training operation, such as regression, logistic regression, decision trees, artificial neural networks, support vector machines, linear regression, nearest neighbor methods, distance based methods, naive Bayes, linear discriminant analysis, k-nearest neighbor algorithm, etc.

Once the predictive model 132 has been trained by the predictive modeler 218, the trained predictive model 224 is used by a survey generator 212 of the survey component 124 to determine whether to send a survey and/or what survey to send to the user. When a new audio stream 210 spoken by a user is received at the paralinguistics analyzer 214, the paralinguistics analyzer 214 analyzes the new audio stream 210 and estimates an attribute 220. The estimated user attribute 220 is the same type of user attributes 222 estimated and used to train the predictive model 132. That is, the same attribute(s) used by the predictive modeler 218 to train the predictive model 132 are used to by the survey generator 212 to determine what survey, if any, to provide to the user (e.g., if the estimated user attributes 222 used to train the predictive model 132 were the users' positive/negative emotional states, then the user attribute 220 estimated for the new user is the new user's positive/emotional state).

The survey generator 212 may determine whether to send a survey to the user, when to send a survey, and/or what content to include in a survey based on the trained predictive model 224, the user's estimated attribute 220, and survey thresholds 138 stored at the server 108. For example, the survey generator 212 may determine a response score indicative of an estimated quality of the user's survey response based on the trained predictive model 224 and the estimated attribute 220 of the user. The survey generator 212 then uses the determined response score corresponding to the estimated quality of the user's survey response in addition to survey thresholds 138 input by an administrator to determine what survey, if any, to send to the user.

For example, the survey generator 212 may determine whether or not to send a survey based on a first survey threshold 138. If the determined response score is below the first survey threshold 138 stored at server 108, the survey generator 212 may determine not to send a survey. If the determined response score satisfies the first survey threshold 138, the survey generator 212 sends a survey. The survey generator 212 may also determine a time to send the survey. For example, if the determined response score is less than a second survey threshold 138, the survey generator 212 may send the survey after the user has finished using the application. Such a delayed survey may be sent through any form of communication, such as email, text message, letter mail, etc. If the determined response score satisfies the second survey threshold 138, the survey generator 212 may present the survey to the user as a pop-up display immediately or at any point in time while the user is using the application. The survey generator 212 may also determine content to include in the survey. For example, if the score is less than a third survey threshold 138, the survey generator 212 may send a relatively short survey from a survey database 130 at the server 108 to the user. However, if the score satisfies the third survey threshold 138, the survey generator 212 may send a relatively long survey from a survey database 130 at the server 108 to the user.

In one embodiment, if the survey response quality component 216 evaluated different scores for user responses to different types of content or questions in the survey, and such scores 226 were used to train the predictive model 132, the survey generator 212 may determine different scores indicative of the estimated quality of the user's responses for the different types of content or questions in the survey. In such a case, the survey generator 212 may make one or more determinations separately with respect to each type of content or question in the survey. For example, the survey generator 212 may determine a second score indicative of the estimated quality of the user's response to survey questions regarding feature A of the software product. The survey generator 212 may determine a third score indicative of the estimated quality of the user's response to survey questions regarding feature B of the software product. The survey generator 212 may determine whether to include questions in the survey regarding feature A based on the second score and based on a fourth threshold 138. The survey generator 212 may determine whether to include questions in the survey regarding feature B based on the third score and based on a fifth threshold 138. The administrator determines whether the quality evaluation metrics 136 include instructions for the survey response quality component 216 to individually score the quality of the user's response with respect to various topics and questions, and the administrator likewise determines corresponding thresholds 138 for the various topics and questions.

Figure 3:
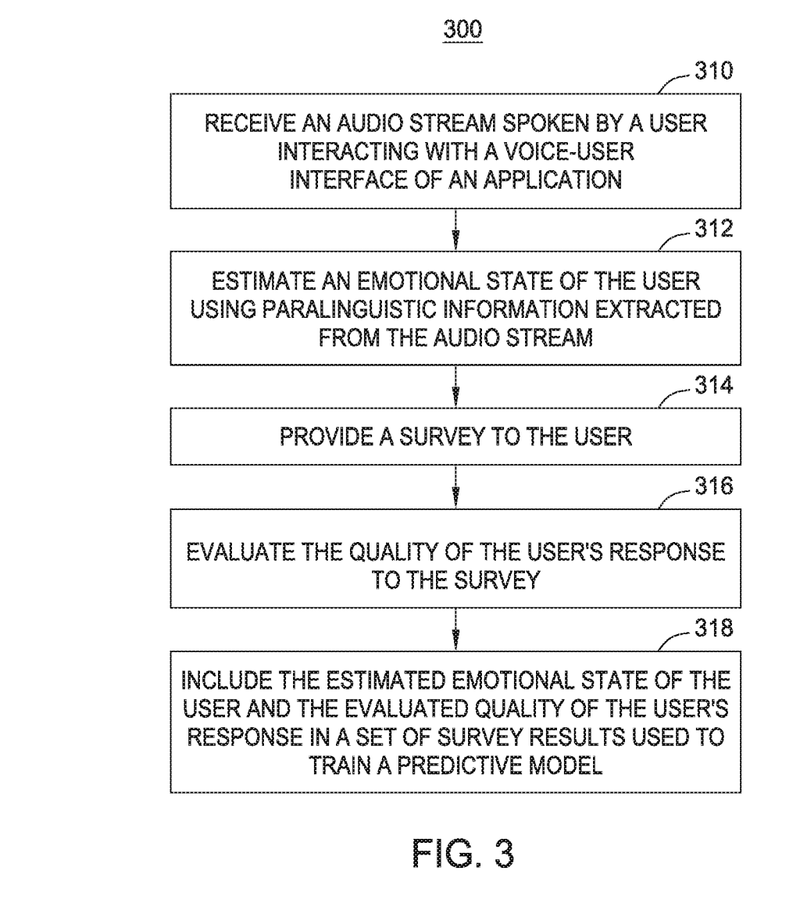
FIG. 3 illustrates a method for obtaining survey results to train a predictive model, according to one embodiment.

FIG. 3 illustrates a method 300 for obtaining survey results to train a predictive model 132, according to one embodiment. The method 300 begins at block 310 with the server 108 receiving an audio stream 210 capturing a phrase spoken by a user interacting with a voice-user interface of a software application. For example, the audio stream 210 may be a query, a command spoken by the user, or any other spoken input from the user. At block 312, the paralinguistics analyzer 214 estimates an emotional state attribute 222 of the user using paralinguistic information extracted from the audio stream 210. For example, paralinguistic information indicative of a positive or negative emotional state may be extracted from the audio stream 210 and used to estimate the positive/negative emotional state attribute 222 of the user by comparing the extracted paralinguistic information to different low level descriptors or combinations of low level descriptors correlated with positive/negative attributes in speech database 134 stored at server 108. At block 314, a survey is provided to the user. The survey provided to the user may be retrieved from a survey database 130 and may have been created by an administrator. Block 316 includes evaluating the quality of the user's response to the survey 226. The user's response is evaluated according to quality evaluation metrics 136 stored at the server 108. Evaluating the quality of the user's response to the survey may include scoring the user's response according to scoring instructions provided in the quality evaluation metrics 136. The user's response may be evaluated with respect to the survey as a whole or the user's response may be evaluated separately with respect to different types of content or questions in the survey. At block 318, the emotional state attribute 222 of the user estimated at block 312 and the quality of the user's response 226 evaluated at block 316 are included in a set of survey results used to train a predictive model 132.

Figure 4:
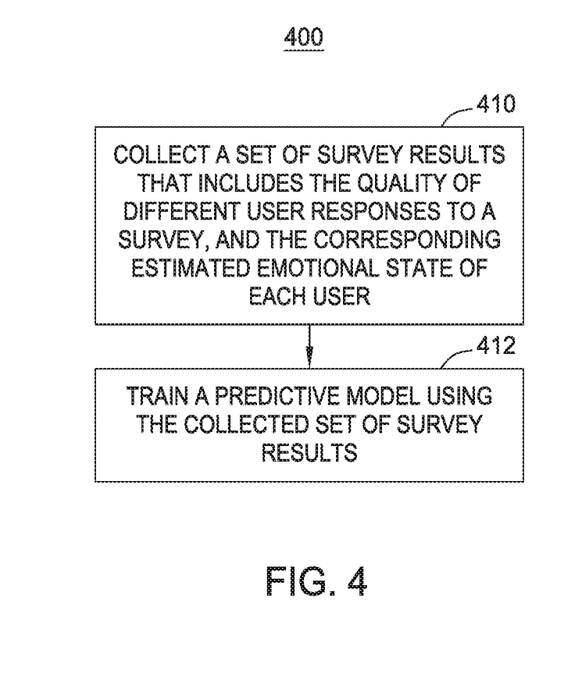
FIG. 4 illustrates a method for training a predictive model with a collected set of survey results, according to one embodiment.

FIG. 4 illustrates a method 400 for training a predictive model 132 with a collected set of survey results, according to one embodiment. At block 410, the method 400 begins with collecting a set of survey results that includes the quality of different user responses to a survey 226, and a corresponding estimated emotional state attribute 222 of each user. For example, the set of results may have been created by performing the method 300 with the same survey for a plurality of users. At block 412 the predictive modeler 218 trains a predictive model 132 using the collected set of survey results 412. Once the predictive model 132 has been trained, the trained predictive model 224 can be used to generate surveys according to the method 500 described below with respect to FIG. 5.

Figure 5:
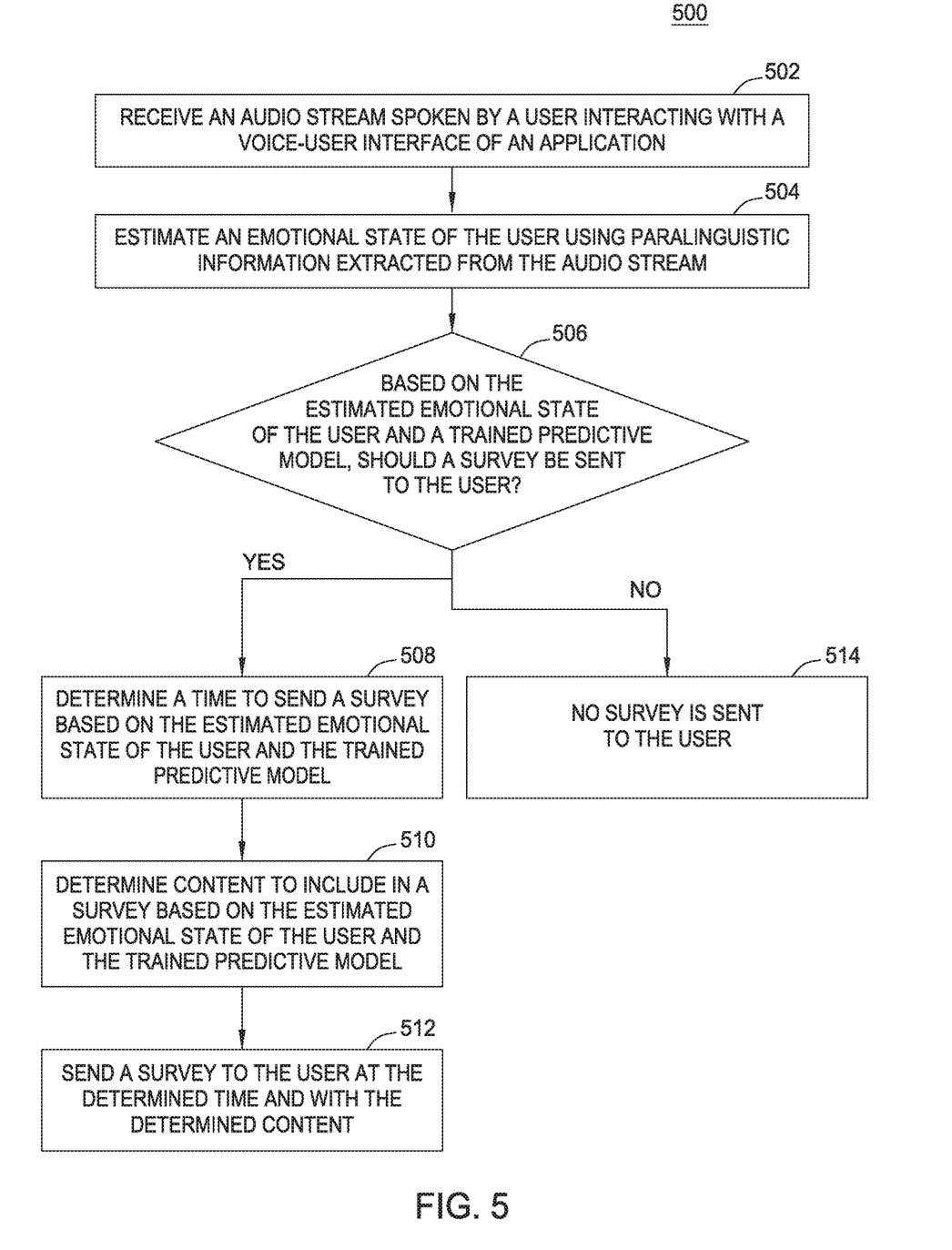
FIG. 5 illustrates a method for determining what survey, if any, to provide to a user, according to one embodiment.

FIG. 5 illustrates a method 500 for determining what survey, if any, to provide to a user, according to one embodiment. At block 502, the method 500 begins with receiving at server 108 an audio stream 210 spoken by a user interacting with a voice-user interface of a software application, just as described above with respect to FIG. 3 at block 310. At block 504, the paralinguistics analyzer 214 estimates an emotional state attribute 220 of the user using paralinguistic information extracted from the audio stream 210, just as described above with respect to FIG. 3 at block 312. At block 506, the survey generator 212 determines whether a survey should be sent to the user based on the emotional state attribute 220 of the user estimated at block 504 and based on a trained predictive model 224, such as a predictive model trained according to method 400 described above.

If the survey generator 212 determines that no survey should be sent to the user (block 506), the method 500 ends (block 514). Otherwise, at block 508, the survey generator determines a time to send a survey based on the estimated emotional state attribute 220 of the user and based on the trained predictive model 224. For example, this determination may include determining whether to send the user a survey immediately or during the user's use of the application, or after the user has finished using the application. Next, at block 510, the survey generator 212 determines content to include in a survey based on the estimated emotional state attribute 220 of the user and the trained predictive model 224. For example, the determination at block 510 may include determining whether to send the user a relatively short survey, with less content, or a relatively long survey, with more content. The surveys may be retrieved from survey database 130 at the server 108. The determination at block 510 may also include selecting types of content or questions from surveys retrieved from survey database 130 to include in the survey. Block 512 includes sending a survey to the user at the time determined at block 508 and with the content determined at block 510. The survey may be sent or presented to the user through any means of communication, such as a pop-up display, e-mail, a telephone call, SMS messages, letter mail, etc.

Embodiments described above are not limited to being performed with respect to an emotional state attribute 220, 222, as described herein. In alternative embodiments, the emotional state attribute 220, 222 described above may be replaced by or included with one or more other attributes (e.g., gender, age, etc.) that may be estimated using paralinguistic information extracted from audio streams 210. Further, determining what survey, if any, to provide to a user may involve the use of other factors in addition to the use of user attributes estimated using paralinguistic information. For example, in addition to using the user attributes estimated using paralinguistic information, any other available information about users, such as tax information, product click stream, etc., may be used to determine what survey, if any, to provide to a user.

Figure 6:
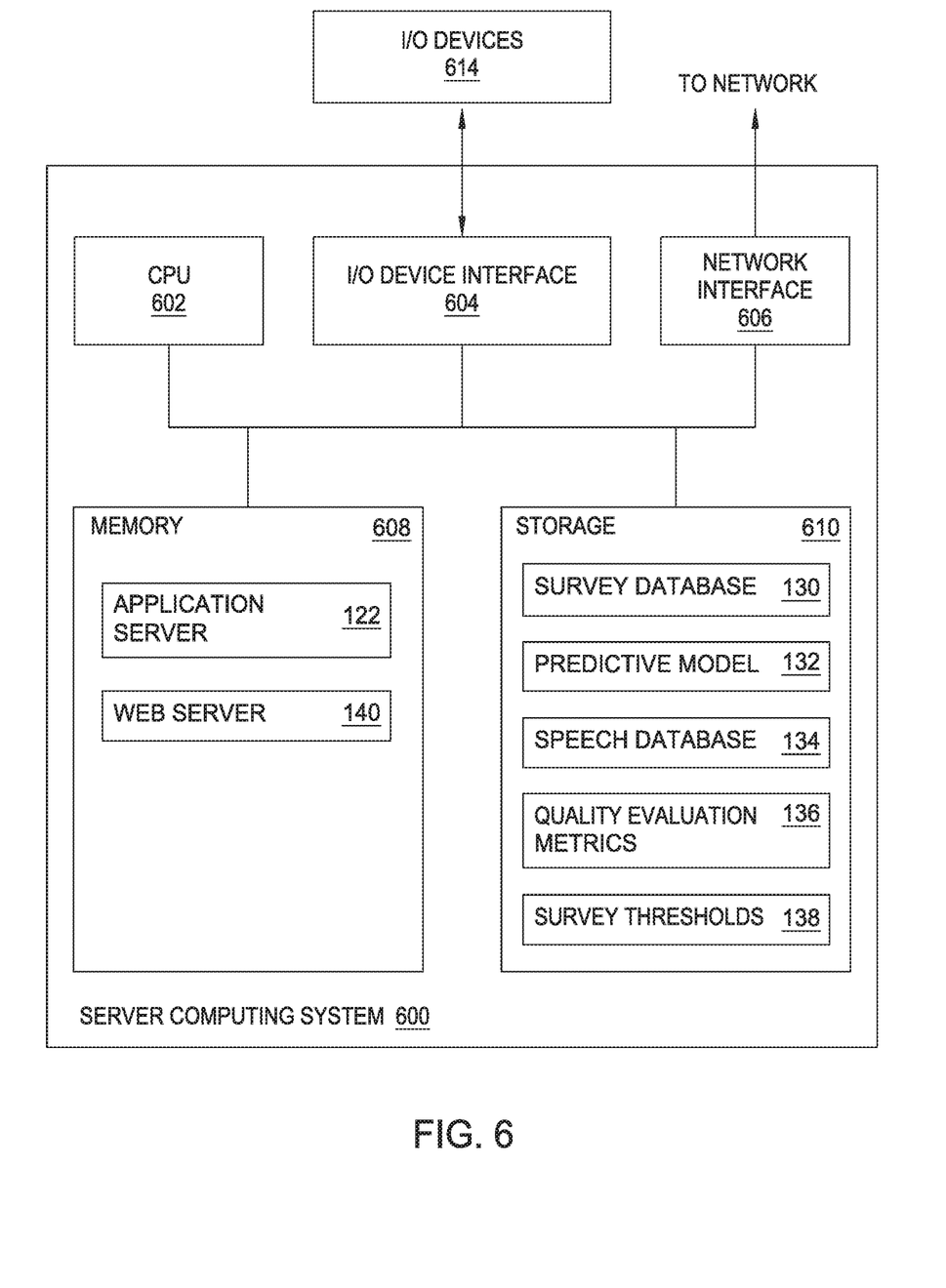
FIG. 6 illustrates an example computing system for determining what survey, if any to send to a user based on paralinguistic information extracted from voice/speech of a user, according to one embodiment.

FIG. 6 illustrates an example computing system 600 for determining what survey, if any to send to a user based on paralinguistic information extracted from voice/speech of a user, according to one embodiment. As shown, the computing system 600 includes, without limitation, a central processing unit (CPU) 602, one or more I/O device interfaces 604 which may allow for the connection of various I/O devices 614 (e.g., keyboards, displays, mouse devices, pen input, etc.) to the computing system 600, network interface 606, a memory 608, storage 610, and an interconnect 616.

CPU 602 may retrieve and execute programming instructions stored in the memory 608. Similarly, the CPU 602 may retrieve and store data residing in the storage 610. The interconnect 616 transmits programming instructions and data, among the CPU 602, I/O device interface 604, network interface 606, memory 608, and storage 610. CPU 602 can represent a single CPU, multiple CPUs, a single CPU having multiple processing cores, and the like. Additionally, the memory 608 represents random access memory. Furthermore, the storage 610 may be a disk drive. Although shown as a single unit, the storage 610 may be a combination of fixed or removable storage devices, such as fixed disc drives, removable memory cards or optical storage, network attached storage (NAS), or a storage area-network (SAN).

As shown, memory 608 includes application server 122 and web server 140. The web server 140 receives an audio stream input by a user. Based on the audio stream, application server 122 determines what survey, if any, should be provided to the user. Specifically, the application server 122 determines what survey from survey content stored at survey database 130 in storage 610 should be provided to the user based on an attribute of the user estimated using paralinguistic information extracted from the audio stream, a predictive model 132, and survey thresholds 138 in storage 610. The attribute of the user is estimated using the speech database 134 in storage 610. Storage 610 also includes quality evaluation metrics 136 used to evaluate survey responses that are used to train the predictive model 132.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for providing a survey to a user, the method comprising:
    receiving an audio stream including utterances spoken by the user interacting with a voice-user interface of an application;
    determining a set of paralinguistic features from the audio stream by extracting low level descriptors from frames of the audio stream;
    determining at least a first estimated attribute of the user based on the set of paralinguistic features by comparing the low level descriptors extracted from the audio stream to attributes in a speech database;
    determining a first estimated survey response quality score for a tailored survey for the user corresponding to a first topic related to a first feature of the application and a second estimated survey response quality score for the tailored survey for the user corresponding to a second topic related to a second feature of the application based on at least the first estimated attribute by providing the first estimated attribute of the user as an input to a predictive model that was trained using survey response quality scores assigned to historical user responses to questions regarding the first topic related to the first feature of the application and questions regarding the second topic related to the second feature of the application;
    generating the tailored survey for the user based on the first estimated survey response quality score and the second estimated survey response quality score, wherein generating the tailored survey comprises:
        determining whether to include a first question regarding the first topic related to the first feature of the application in the tailored survey based on whether the first estimated survey response quality score exceeds a first threshold; and
        determining whether to include a second question regarding the second topic related to the second feature of the application in the tailored survey based on whether the second estimated survey response quality score exceeds a second threshold; and
    transmitting the tailored survey to the user.

2. The method of claim 1, further comprising:
    determining if the first estimated survey response quality score exceeds a third threshold;
    if the first estimated survey response quality score exceeds the third threshold, selecting a transmission time so that the tailored survey will be transmitted to the user while the user is using the application; and
    if the first estimated survey response quality score does not exceed the third threshold, selecting a transmission time so that the tailored survey will be transmitted to the user after the user has stopped using the application.

3. The method of claim 2, wherein transmitting the tailored survey to the user while the user is using the application comprises transmitting the tailored survey as a pop-up display, and transmitting the tailored survey to the user after the user has stopped using the application comprises sending the tailored survey in one of an e-mail, an SMS message, a phone call, or letter mail.

4. The method of claim 1, wherein the survey response quality scores were assigned to the historical user responses by evaluating the historical user responses according to quality evaluation metrics.

5. The method of claim 4, wherein the quality evaluation metrics relate to at least one of: completeness of answers; variability of responses to questions; or length of time spent taking a survey.

6. The method of claim 1, wherein the low level descriptors comprise one or more of: intonation; intensity; linear prediction cepstral coefficients (LPCC); perpetual linear prediction (PLP) parameters; cepstral coefficients; spectrum; harmonicity; perturbation; linguistic entities; non-linguistic strings; or disfluencies.

7. The method of claim 1, wherein the first estimated attribute is one of an estimated emotional state of the user, an estimated age of the user, and an estimated gender of the user.

8. A non-transitory computer-readable storage medium comprising instructions that, when executed by one or more processors of a computing system, cause the computing system to perform an operation for providing a survey to a user, the operation comprising:
    receiving an audio stream including utterances spoken by the user interacting with a voice-user interface of an application;
    determining a set of paralinguistic features from the audio stream by extracting low level descriptors from frames of the audio stream;
    determining at least a first estimated attribute of the user based on the set of paralinguistic features by comparing the low level descriptors extracted from the audio stream to attributes in a speech database;
    determining a first estimated survey response quality score for a tailored survey for the user corresponding to a first topic related to a first feature of the application and a second estimated survey response quality score for the tailored survey for the user corresponding to a second topic related to a second feature of the application based on at least the first estimated attribute by providing the first estimated attribute of the user as an input to a predictive model that was trained using survey response quality scores assigned to historical user responses to questions regarding the first topic related to the first feature of the application and questions regarding the second topic related to the second feature of the application;
generating the tailored survey for the user based on the first estimated survey response quality score and the second estimated survey response quality score, wherein generating the tailored survey comprises:
determining whether to include a first question regarding the first topic related to the first feature of the application in the tailored survey based on whether the first estimated survey response quality score exceeds a first threshold; and
determining whether to include a second question regarding the second topic related to the second feature of the application in the tailored survey based on whether the second estimated survey response quality score exceeds a second threshold; and
transmitting the tailored survey to the user.

9. The non-transitory computer-readable storage medium of claim 8, the operation further comprising:
determining if the first estimated survey response quality score exceeds a third threshold;
if the first estimated survey response quality score exceeds the third threshold, selecting a transmission time so that the tailored survey will be transmitted to the user while the user is using the application; and
if the first estimated survey response quality score does not exceed the third threshold, selecting a transmission time so that the tailored survey will be transmitted to the user after the user has stopped using the application.

10. The non-transitory computer-readable storage medium of claim 9, wherein transmitting the tailored survey to the user while the user is using the application comprises transmitting the tailored survey as a pop-up display, and transmitting the tailored survey to the user after the user has stopped using the application comprises sending the tailored survey in one of an e-mail, an SMS message, a phone call, or letter mail.

11. The non-transitory computer-readable storage medium of claim 8, wherein the survey response quality scores were assigned to the historical user responses by evaluating the historical user responses according to quality evaluation metrics.

12. The non-transitory computer-readable storage medium of claim 11, wherein the quality evaluation metrics relate to at least one of: completeness of answers; variability of responses to questions; or length of time spent taking a survey.

13. The non-transitory computer-readable storage medium of claim 8, wherein the low level descriptors comprise one or more of: intonation; intensity; linear prediction cepstral coefficients (LPCC); perpetual linear prediction (PLP) parameters; cepstral coefficients; spectrum; harmonicity; perturbation; linguistic entities; non-linguistic strings; or disfluencies.

14. The non-transitory computer-readable storage medium of claim 8, wherein the first estimated attribute is one of an estimated emotional state of the user, an estimated age of the user, and an estimated gender of the user.

15. A system, comprising:
one or more processors; and
memory storing instructions, which, when executed on the one or more processors of a computing system, cause the computing system to perform an operation for providing a survey to a user, the operation comprising:
receiving an audio stream including utterances spoken by the user interacting with a voice-user interface of an application;
determining a set of paralinguistic features from the audio stream by extracting low level descriptors from frames of the audio stream;
determining at least a first estimated attribute of the user based on the set of paralinguistic features by comparing the low level descriptors extracted from the audio stream to attributes in a speech database;
determining a first estimated survey response quality score for a tailored survey for the user corresponding to a first topic related to a first feature of the application and a second estimated survey response quality score for the tailored survey for the user corresponding to a second topic related to a second feature of the application based on at least the first estimated attribute by providing the first estimated attribute of the user as an input to a predictive model that was trained using survey response quality scores assigned to historical user responses to questions regarding the first topic related to the first feature of the application and questions regarding the second topic related to the second feature of the application;
generating the tailored survey for the user based on the first estimated survey response quality score and the second estimated survey response quality score, wherein generating the tailored survey comprises:
determining whether to include a first question regarding the first topic related to the first feature of the application in the tailored survey based on whether the first estimated survey response quality score exceeds a first threshold; and
determining whether to include a second question regarding the second topic related to the second feature of the application in the tailored survey based on whether the second estimated survey response quality score exceeds a second threshold; and
transmitting the tailored survey to the user.

16. The system of claim 15, further comprising:
determining if the first estimated survey response quality score exceeds a third threshold;
if the first estimated survey response quality score exceeds the third threshold, selecting a transmission time so that the tailored survey will be transmitted to the user while the user is using the application; and
if the first estimated survey response quality score does not exceed the third threshold, selecting a transmission time so that the tailored survey will be transmitted to the user after the user has stopped using the application.

17. The system of claim 16, wherein transmitting the tailored survey to the user while the user is using the application comprises transmitting tailored the survey as a pop-up display, and transmitting the tailored survey to the user after the user has stopped using the application comprises sending the tailored survey in one of an e-mail, an SMS message, a phone call, or letter mail.

18. The system of claim 15, wherein the survey response quality scores were assigned to the historical user responses by evaluating the historical user responses according to quality evaluation metrics.

19. The system of claim 15, wherein the low level descriptors comprise one or more of: intonation; intensity; linear prediction cepstral coefficients (LPCC); perpetual linear prediction (PLP) parameters; cepstral coefficients;

spectrum; harmonicity; perturbation; linguistic entities; non-linguistic strings; or disfluencies.

20. The system of claim 15, wherein the first estimated attribute is one of an estimated emotional state of the user, an estimated age of the user, and an estimated gender of the user.

\* \* \* \* \*